Sept. 1, 1942.  D. E. MORRISON  2,294,417
ALTIMETRIC DETERMINING DEVICE
Filed April 9, 1941  3 Sheets-Sheet 1

INVENTOR
Douglas E. Morrison
BY
ATTORNEYS

Sept. 1, 1942.                D. E. MORRISON                2,294,417
                        ALTIMETRIC DETERMINING DEVICE
                    Filed April 9, 1941         3 Sheets-Sheet 2
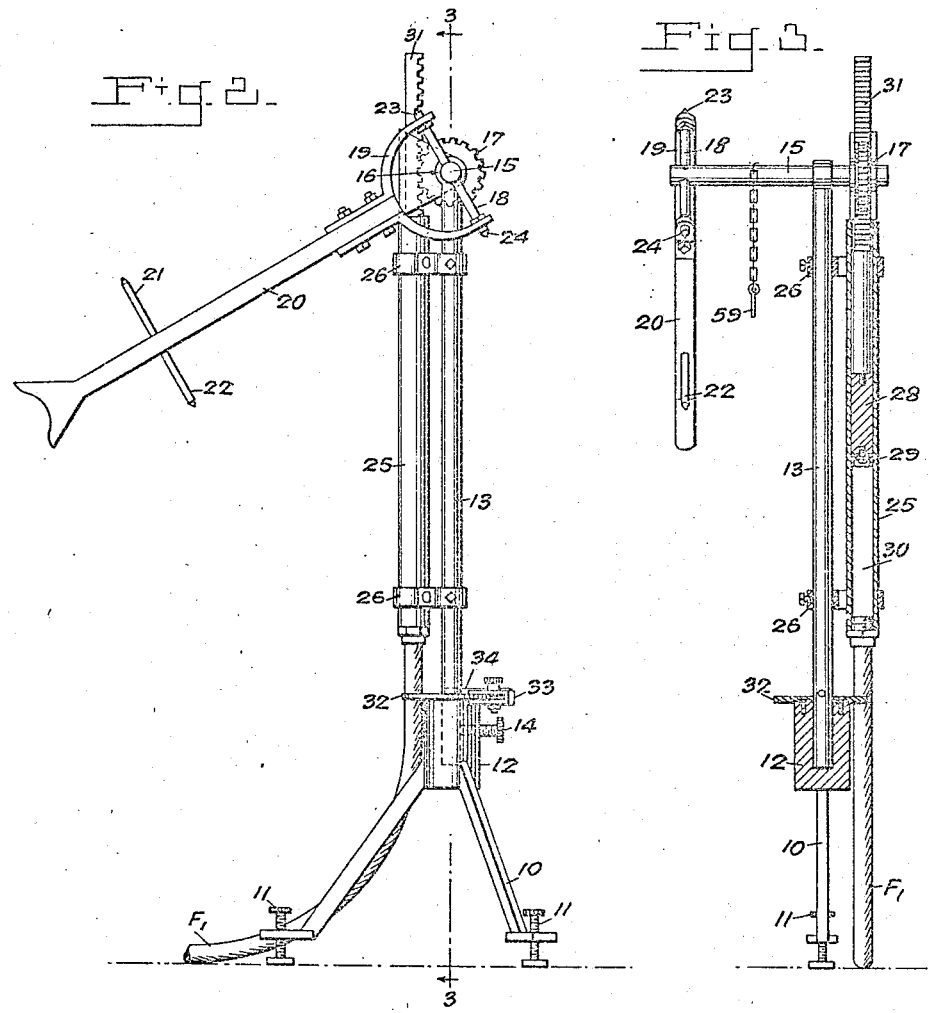
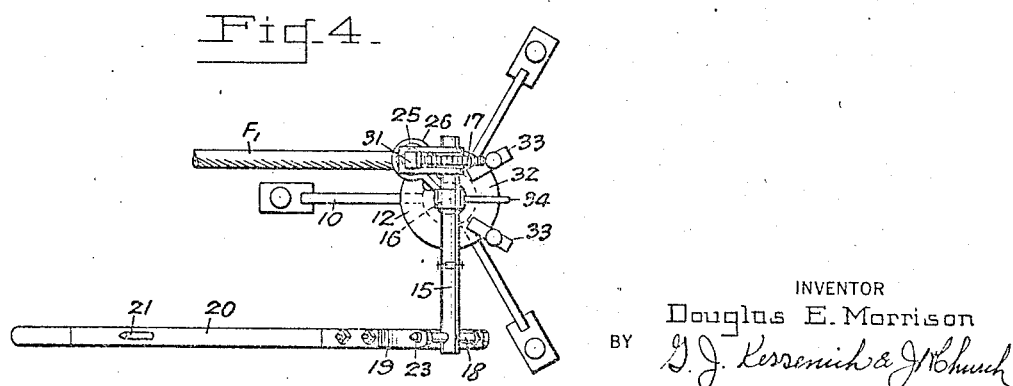
INVENTOR
Douglas E. Morrison
BY
ATTORNEYS Sept. 1, 1942.   D. E. MORRISON   2,294,417
ALTIMETRIC DETERMINING DEVICE
Filed April 9, 1941   3 Sheets-Sheet 3

INVENTOR
Douglas E. Morrison
BY
ATTORNEYS

Patented Sept. 1, 1942

2,294,417

UNITED STATES PATENT OFFICE 2,294,417

ALTIMETRIC DETERMINING DEVICE

Douglas E. Morrison, United States Army, Trenton, Ga.

Application April 9, 1941, Serial No. 387,659
7 Claims. (Cl. 33—66)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to an altimetric determining device for constantly determining the altitudes of aerial targets.

A principal object of the invention is to provide a rugged, simple, flexible altimetric device adapted for quantity production at low cost.

A further object of the invention is to provide an altimetric device especially useful for determining the altitude of fast moving low flying aircraft adapted for use with a relatively short base.

The specific nature of the invention as well as other objects and advantages thereof will clearly appear from a description of a preferred embodiment as shown in the accompanying drawings in which:

Fig. 2 is a side elevation of a hydraulic altimeter base end instrument constituting one of the instruments of the device of this invention;

Fig. 3 is a sectional view taken upon the line 3—3 of Fig. 2;

Fig. 4 is a plan view of the instrument shown in Fig. 2;

Figure 1:
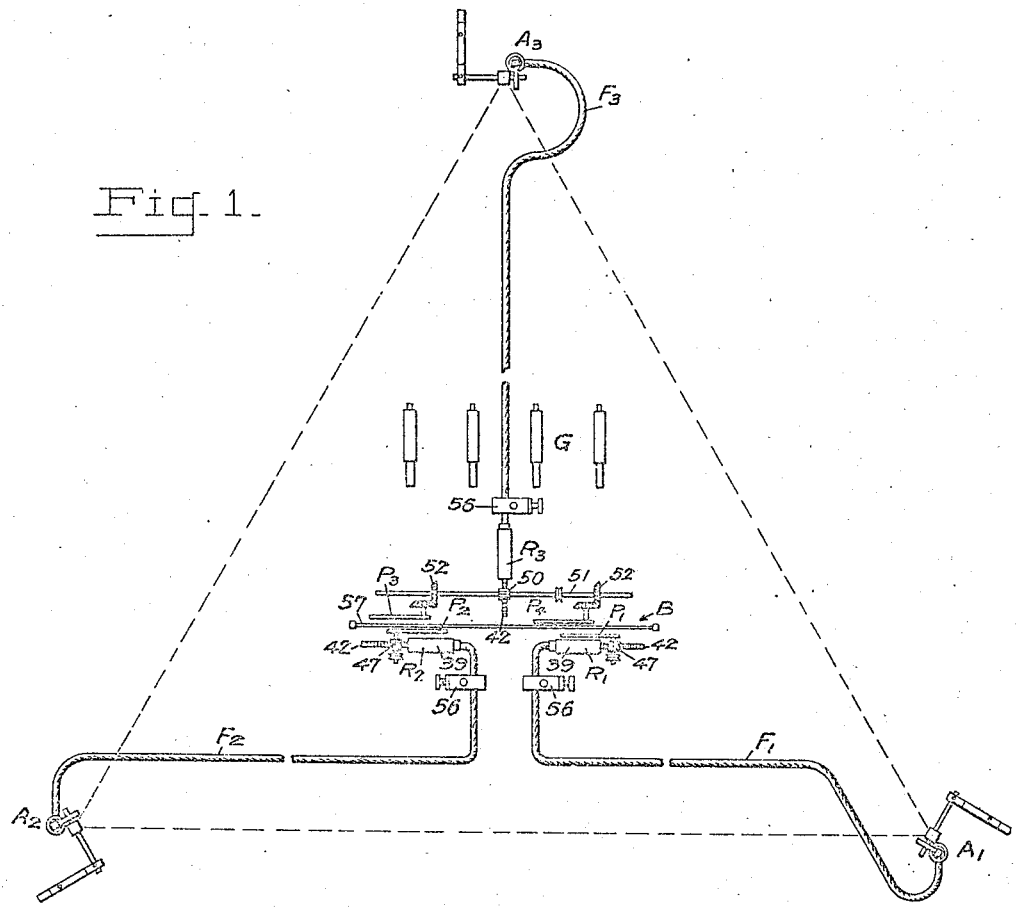
Fig. 1 is a diagrammatic view showing the manner in which the altimetric device of this invention is disposed with respect to a firing battery.
Figure 5:
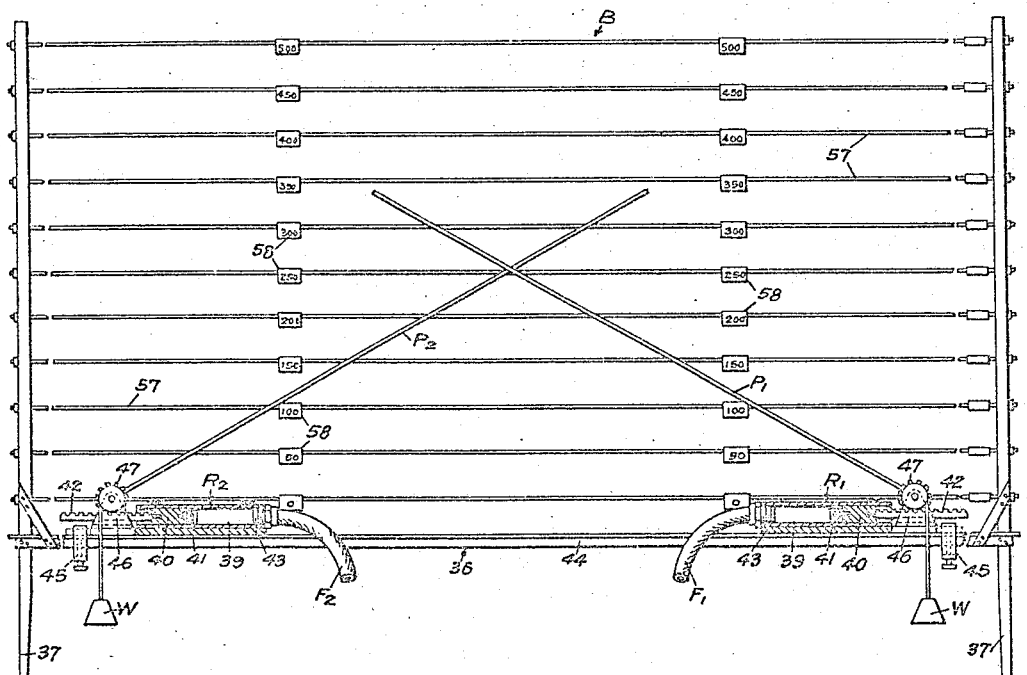
Fig. 5 is a front elevation of the hydraulic altitude plotting instrument of this invention with certain parts shown in section and other parts omitted for the sake of clarity of illustration.

Referring now to the drawings and in particular to Fig. 1 which shows a present preferred arrangement of the altimetric device or system of this invention, there are shown a plurality of altimeter base end instruments $A_1$, $A_2$, $A_3$, etc., it being contemplated that three such instruments will suffice for the usual situation. The instruments $A_1$, $A_2$, and $A_3$ are arranged in the form of a triangle about the battery G at known distances apart and are used to measure the angular heights of a target in the plane of a base line constituting one of the sides of the triangle and transmit the same by suitable means, herein shown as hydraulic transmission lines, to a plotting instrument B where altitude is graphically and continuously determined and transmitted to another or other fire control instruments as required, such as the data computer P as shown in Fig. 1 of my copending application, Serial No. 387,657 filed April 9, 1941.

Each of the altimeter base end instruments $A_1$, $A_2$, $A_3$, etc. are identical in construction and comprise a suitable support such as a tripod 10 which may be provided with leveling devices 11 to level the head 12 thereof.

A vertically disposed shaft 13 is rotatably mounted in the tripod head 12 in any suitable manner and may be locked against rotation as by means of the set screw 14. At the upper end portion of shaft 13, a second shaft 15 is suitably journaled thereon as by means of a diametral bore 16 formed in the shaft 13 rotatably receiving the shaft 15. On one side of shaft 13 a pinion 17 is affixed to the shaft 15 for rotation therewith, and to the other side of shaft 13 a transverse pin 18 is affixed to the shaft 15. The pin 18 has a Y-shaped bracket 19 mounted thereon for rotation about the axis of the pin in such manner as to clear the adjacent end of shaft 15. A shoulder rest 20 is fixed to the bracket 19 as clearly shown in Fig. 2 and carries opposed rear sights 21, 22. Front sights 23, 24 for use with the rear sights 21, 22, respectively, are mounted upon opposed end portions of the pin 18 or bracket 19, as may be desired.

A cylinder 25 is demountably secured to the shaft 13 in parallelism therewith, as by means of the clamps 26 and has provision at its lower open end to removably receive in fluid-sealed relation one end of a flexible conduit $F_1$, $F_2$, $F_3$, etc., according to the base end instrument to which such cable is secured. A piston 28 is disposed within the cylinder and is provided with an obturator cup 29 at its lower end to prevent the escape of fluid from chamber 30 upwardly past the piston. A rack bar 31 is secured to the upper end of the piston 28 and disposed in engagement with the pinion 17 whereby rotation of the shaft 15 and pinion 17 will effect translation of the rack bar 31 and piston 28 in the cylinder 25. An azimuth plate 32 is secured to the tripod head 12 and carries adjustable clamps 33 between which a pin 34 fixed to the shaft 13 may move.

Figure 6:
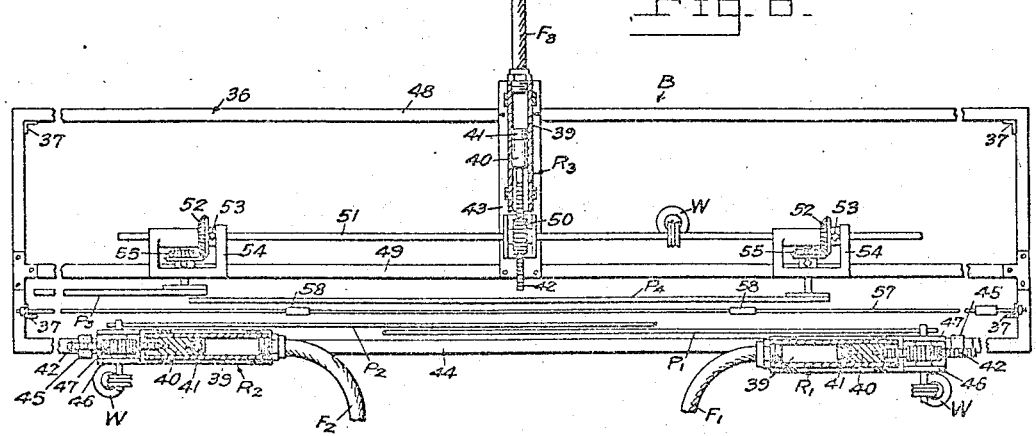
Fig. 6 is a plan view partially in section of the instrument shown in Fig. 5.

The altitude plotting instrument B comprises a base of any desired character which for convenience is herein shown to be a rectangular frame 36 supported by legs 37 at its corners. Secured to the supporting base are receivers $R_1$, $R_2$, $R_3$, etc., corresponding to the base end instruments $A_1$, $A_2$, $A_3$, etc. Each of the receivers are identical in construction and comprise a cylinder 39 provided with a piston 40 and obturator cup 41 secured to a rack bar 42. The receivers $R_1$ and $R_2$ are mounted upon supports 43 which are adjustable to and from each other on the front side element 44 of the frame 36 and may be retained in adjusted position by clamps 45. The supports 43 are each provided with brackets 46 within which pinions 47 are journaled in meshing relation with the rack bars 42. A plotting arm $P_1$ is secured to the pinion 47 of receiver $R_1$ through the axle therefor while similarly a plotting arm $P_2$ is secured to the pinion 47 of receiver $R_2$ in like manner. The receiver $R_3$ is mounted intermediate the ends and transversely of the rear side element 48 of the frame 36 with its forward end portion supported by an intermediate frame member 49. The forward end of the support for receiver $R_3$ has a pinion 50 mounted thereon upon a shaft 51 extending to either side in parallelism with the sides of the frame and racks 42 of receivers $R_1$, $R_2$. Mounted upon the shaft 51 on either side of the pinion 50 is a bevel or other suitable gear 52 adapted to be slidably moved upon the shaft and retained in desired position by set screws 53. Assembly frames 54 are slidably mounted upon the shaft 51 about each of the gears 52 and have gears 55 therein intermeshing with the gears 52. The gears 55 have their axes of rotation in planes parallel to the planes containing the axes of rotation of pinions 47 and the assembly frames are supported upon the member 49 in such manner as to dispose the axes of the pinions 55 in the horizontal plane. As clearly shown in Fig. 6, the assembly frames are held in position upon the shaft 51 by the gears 52 and set screws 53. Plotting arms $P_3$, $P_4$ are secured to the ears 55, respectively, in parallel relation to each other and in a plane parallel to the plane containing arms $P_1$, $P_2$. The conduits $F_1$, $F_2$, $F_3$, etc. are secured to the cylinders 39 of the receivers $R_1$, $R_2$ and $R_3$ in fluid-sealed relation and to maintain a back pressure in the conduits when charged with fluid, the pinions 47, 50 are biased to move the pistons 40 toward normal positions adjacent the entrance ends of the cylinders as by means of weights W suspended from cables attached to the shafts of pins 47, 50 or suitable springs for such purpose. Replenishing reservoirs 56 similar to the device disclosed in Fig. 6 of the transmission system of my co-pending application Serial No. 387,658 filed April 9, 1941, for the purpose of keeping a constant volume of fluid in each of the conduits $F_1$, $F_2$, $F_3$, etc. and associated transmitter and receiver cylinders are provided as indicated in Fig. 1.

A grid of any suitable construction is placed in the vertical plane between the plotting arms $P_3$, $P_4$ and $P_1$, $P_2$. Conveniently the grid may be formed of a series of vertically spaced parallel wires 57 spaced to a scale adapted to the purpose and identified by tabs 58 numbered to correspond to the altitude that the given wire represents. By this construction, intersections of the plotting arms $P_1$, $P_2$ etc. may be viewed against the grid from either side thereof.

In operation the base end instrument cylinders 25, conduits $F_1$, $F_2$, $F_3$ etc. and altitude instrument receiver cylinders 39 will be filled with fluid through the replenishing reservoirs 56. The base end instruments $A_1$, $A_2$, $A_3$, etc. will each be oriented by first arranging the shoulder rest 20 in parallelism with the face of pinion 17, in which position it may be held as by inserting a pin 59 through properly aligned holes in the shaft 15 and pin 19. Next the sights of a particular base end instrument, for example instrument $A_1$, will be aligned upon one of the other instruments with which it is arranged to cooperate, for example, instrument $A_2$ and a clamp 33 clamped in abutting relation with the pin 34 to prevent counterclockwise movement of the sights out of alignment with instrument $A_2$ as viewed in Fig. 1. The sights of instrument $A_1$ are next trained upon the other instrument $A_3$ in the system with which it is arranged to cooperate and the other clamp 33 locked in abutting relation with pin 34 to prevent clockwise movement of the sights away from alignment with instrument $A_3$ as viewed in Fig. 1. A similar procedure is followed in orienting the other instruments $A_2$, $A_3$ of the system after which the pins 59 are removed. The instruments $A_1$, $A_2$, $A_3$ are now conditioned for service with the pin 34 of each instrument located between the clamps 33 thereof and the clamps arranged to abut the pin 34 to position the sights in the plane of one of the base lines $A_1$—$A_2$, $A_2$—$A_3$, or $A_3$—$A_1$ as the case may be. When a target is designated, the base line to be used will also be indicated which for the purpose of further illustration will herein be selected as $A_1$—$A_3$. Upon indication of base line $A_1$—$A_3$ as the base line to be employed, as by suitable prearranged signal or a communication system, the base end instrument operators $A_3$, $A_1$ will swing their instruments to a position where the pins 34 will abut the clamps 33 in such manner that the sights thereof will be disposed in the plane of base line $A_3$—$A_1$, in which position the shafts will be locked by the set screws 14. The base end instrument operators $A_1$, $A_3$ then track the target by aligning the sights 21, 23 or 22, 24, as the case may be, upon the target. Component movement of the sights in the plane of the base line $A_3$—$A_1$ will be transmitted through rotation of the pinions 17, racks 31, pistons 28, fluid in conduits $F_1$, $F_3$, pistons 40, racks 42 and pinions 47, 50, shaft 51, gears 52, 55 to the plotting arms $P_1$, $P_3$ to cause the latter to intersect before the grid in scale relation to the vertical projection of the angular heights of the target upon the vertical plane containing the base line $A_3$—$A_1$ as observed from the stations of instruments $A_3$, $A_1$. It will be understood that during the orientation process, the axes of rotation of the plotting arms $P_1$, $P_2$, $P_3$, $P_4$ were positioned apart upon the altitude instrument to scale in conformity with the base line distances $A_1$—$A_2$, $A_2$—$A_3$ and $A_3$—$A_1$, respectively. The intersection of plotting arms $P_1$, $P_3$ may be read in terms of altitude from the grid and transmitted by any suitable means to a position where required. It is of course obvious that the receiver $A_3$ must have the two plotting arms $P_3$, $P_4$ in order to get intersections with either of the plotting arms $P_1$, $P_2$ where only one receiver is employed as indicated.

The base end instruments are capable of measuring and transmitting angles from 0° to 180° by the simple expedient of changing from sights 21, 23 to 22, 24 or vice versa as the target passes the zenith. In order to prevent transmitting angles 90° in error to the altitude instrument, the stock may be appropriately marked to indicate the side that is to always be held next to the face of pinion 17.

Operation of the other base end instruments on the other base lines will be in a manner similar to that above described in connection with base end instruments $A_1$, $A_3$.

Having now described a present preferred embodiment of the present invention, I claim:

1. In an altimetric determining system a base end instrument comprising in combination, a vertically disposed shaft, a second shaft rotatably mounted on said first named shaft for movement about an axis normal to said first shaft, a pin fixed to said second shaft transversely thereof, a sighting system attached to said pin for rotation about the axis thereof, and means attached to the vertically disposed shaft and controlled by rotation of said second shaft for transmitting movement of said last named shaft.

2. In an altimetric determining system a base end instrument comprising in combination, a vertically disposed rotatable shaft, a second shaft rotatably mounted on said first named shaft for movement about an axis normal to said first shaft, a pin fixed to said last named shaft transversely thereof, a sighting system attached to said pin for rotation about the axis thereof, a cylinder fixed to the first shaft, a piston mounted in the cylinder, a rack bar secured to the piston, and a pinion secured to the second shaft in intermeshing relation with the rack bar.

3. The structure of claim 2 wherein said sighting system comprises a shoulder rest secured to said pin for rotation about the axis thereof and opposed front and rear sights mounted upon opposed portions of said pin and shoulder rest.

4. In an altimetric determining system and altitude instrument comprising in combination, a base, a pair of receivers adjustably mounted upon said base, a plotting arm mounted on each of said receivers for rotation thereby about parallel axes into intersecting relation relative to each other, a third receiver mounted on said base, a pair of spaced parallel arms mounted to be controlled by said third receiver, and means controlled by said third receiver and connecting said spaced arms for synchronous rotation in a plane parallel to the plane of said first arms into intersecting relation with the latter.

5. In an altimetric determining system an altitude instrument comprising in combination a base, a pair of cylinders adjustably secured to said base in spaced relation, pistons mounted in said cylinders, racks secured to the pistons, pinions mounted on parallel axes intermeshing with said racks, a plotting arm secured to each pinion for rotation about the axis thereof into intersecting relation, a third receiver mounted on the base provided with a piston and rack, a pinion mounted in intermeshing relation with the rack, a shaft secured to the pinion and extending to either side thereof, gears adjustably mounted upon either end portion of the shaft, assembly frames mounted on the shaft and retained in position of said gears, additional gears mounted in said assembly frames in intermeshing relation with said first named gears for rotation about axes parallel to the axis of rotation of said plotting arms, a plotting arm secured to each of said last named gears for rotation in parallel relation and into intersecting relation with said first named plotting arms, and means for connecting hydraulic conduits to all of said cylinders.

6. The structure of claim 5 in combination with means for creating a back pressure upon a fluid in said conduits.

7. The structure of claim 5 in combination with a grid interposed between said first and last named plotting arms.

DOUGLAS E. MORRISON.